United States Patent Office 2,952,466
Patented Sept. 13, 1960

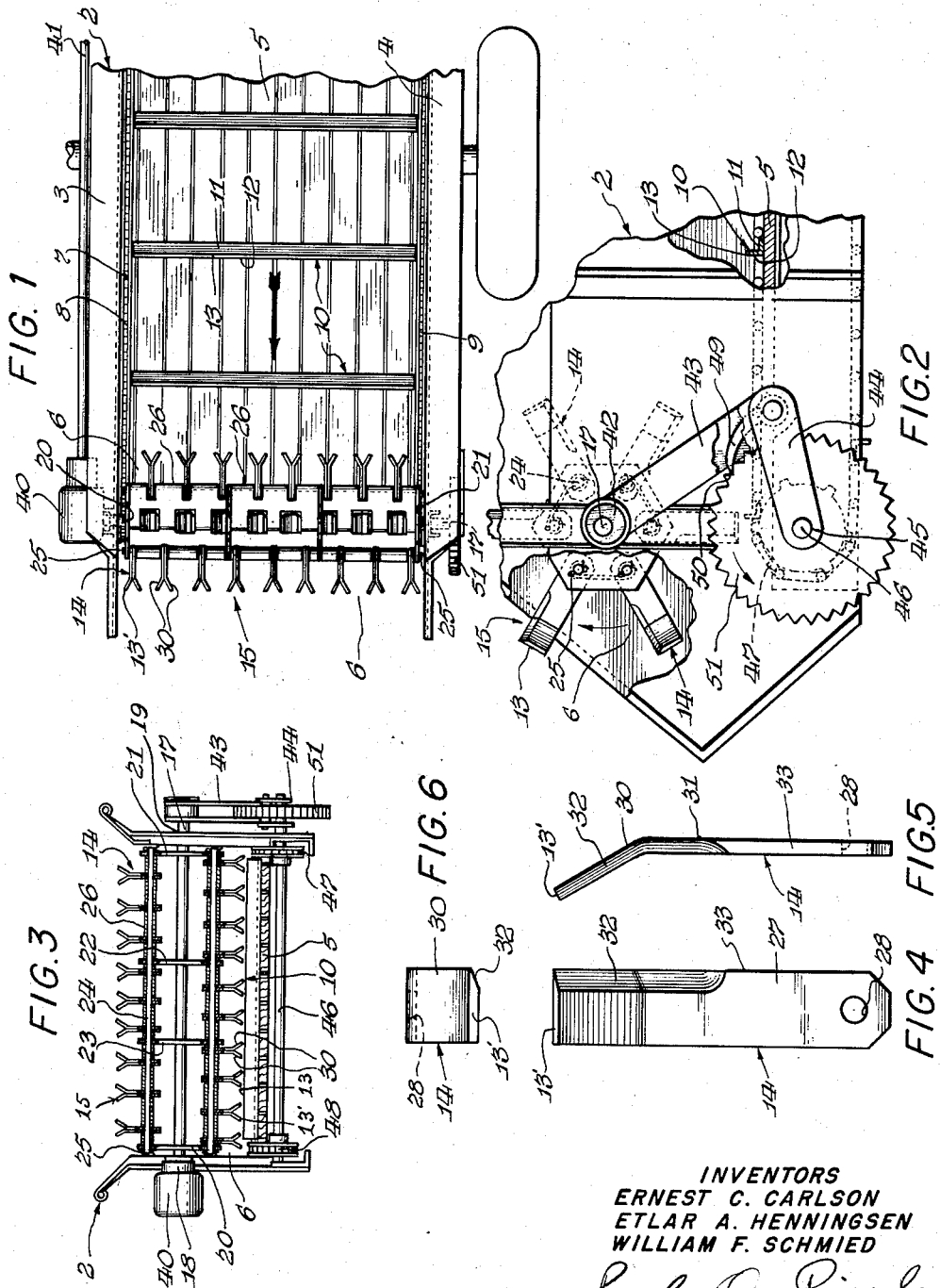

2,952,466
MANURE SPREADER WITH HAMMER KNIFE SHREDDER AND DISTRIBUTOR

Ernest C. Carlson, Wheaton, Etlar A. Henningsen, Riverside, and William F. Schmied, Blue Island, Ill., assignors to International Harvester Company, Chicago, Ill., a corporation of New Jersey Filed Apr. 30, 1957, Ser. No. 656,020

2 Claims. (Cl. 275—6)

This invention relates to manure spreaders and more particularly to a novel comminuting and distributing device therefor.

The general object of the invention is to provide a novel efficient and inexpensive manure spreader wherein the parts are arranged for yieldable inter-action in order to effectively shred the manure and distribute it evenly upon the ground.

A more specific object of the invention is the provision of a novel arrangement of a shredding and distributing unit which cooperates with the slats of the conveyor apron for shredding the material therebetween as it issues through the rear open end of the box.

A still further object of the invention is to provide a novel shredding and comminuting unit arrangement in a manure spreader which includes a drum having a plurality of swinging blades or knives about its outer periphery and the knives being arranged to provide end portions which effectively shred the material being moved thereagainst by the conveyor and to scoop the said material and fling it under the drum rearwardly outwardly in order to provide an effective distribution of very small pieces of the material.

These and other objects of the invention will become more apparent from the specification and the drawings wherein:

Figure 1 is a fragmentary plan view of the novel spreader incorporating the invention;

Figure 2 is a fragmentary side elevational view with parts broken away in order to more clearly show the construction of the comminuting and distributing drum;

Figure 3 is a rear elevational view partially in vertical section of the structure shown in Figures 1 and 2;

Figure 4 is an enlarged side elevational view of one of the knives;

Figure 5 is an edge elevational view; and

Figure 6 is an end elevational view.

Describing the invention in detail and having particular reference to the drawings, there is shown a conventional spreader box generally designated 2 which includes a pair of upstanding sides 3 and 4, a closed bottom 5 and an open rearward end 6 to which the material, not shown, which is deposited on the bottom 5, is adapted to be advanced rearwardly by means of the conveyor generally designated 7 which comprises a pair of chains 8 and 9 along opposite sides of the box extending over and under the bottom and the chains being interconnected by a plurality of slat bars 10 each of which comprise angle irons having a flat bottom flange 11 paralleling the bottom wall 5 and an upstanding flange 12 which has an upper shearing edge 13 which is disposed at a level slightly below the outer edges 13' of the pairs of knives or hammers or blade assemblies 14 of the distributor and shredding unit or drum or rotor component generally designated 15.

It will be seen that the component 15 is disposed across the open rear end 6 of the spreader in the path of the material moving rearwardly in the direction of the arrow as shown in Figure 1 on an axis extending transversely of the box and comprises a center shaft 17 which at each end is carried by bearings 18 and 19 on the side walls 3 and 4 respectively of the box. The center shaft is connected to a pair of end plates 20 and 21 and a pair of intermediate plates 22 and 23, which about their outer peripheries are connected to transverse rods or bars 24 which are disposed generally parallel to the axis of the center shaft or drive shaft 17. The bars 24 may preferably be secured in place by cotter keys 25 on their outer ends for abutment with the end plates 20 and 21 and may have mounted thereon a plurality of sleeves or spacers 26 between which may be interposed the aforementioned blade assemblies 14.

It can be seen that the blades on each shaft are offset axially with respect to the next shaft circumferentially spaced therefrom in order to provide full width coverage across the entire extent of the unit 15 and that the blades are arranged in pairs and that each blade comprises a flat shank portion 27 with a pivot opening 28 at its inner end through which the related rod 24 extends and that the knives are positioned with the shank portions disposed edgewise circumferentially of the drum. The blades have at the outer extremities of the shank portions 27 outer end portions 30 which are angled laterally with respect to the plane of the shank portion 27 and the pairs of hammers or blades are so arranged that they define a Y-shaped configuration in edge view, whereby the outer edge portions diverge outwardly.

It will be seen from reference to Figures 4 through 6 that the outer extremities 31 of the shank portions, as well as the outer end portions 30, are internally beveled as at 32 along the leading edges 33, and that the outer tips 13' of these knives travel in a path spaced slightly above the upper edges 13 of the slats 10, whereby they provide a shearing effect against the flanges 12 of the slats which thus serve as shear bars. Furthermore, the construction and the lateral offset of the end portions provide scoops between adjacent sets of blades for scooping the material and flinging it rearwardly under the drum behind the wagon with a scattering effect.

The drive for the beater rotor 15 may proceed from the left end of the shaft 17 through a gear box 40 which may be driven from the shaft 41 which may be suitably driven from the power take-off of an associated tractor as well known to those skilled in the art.

The drive for the apron may proceed through the center shaft 17 to an eccentric 42 which drives a pitman 43 which, in turn, oscillates a swing link 44 which is journalled as at 45 on the shaft 46 which carries the sprockets 47 and 48 for the chains 8 and 9 at the delivery end of the apron 7. The arm 44 carries a spring pressed pawl 49 which cooperates with teeth 50 of a ratchet wheel 51 for driving the ratchet wheel in the direction of the arrow shown in Figure 2, the ratchet wheel 51 being connected to the shaft 46.

What is claimed is:

1. A manure spreader, a wheeled box having a bottom and an open end, a conveyor therein for moving the material out through said open end and comprising a plurality of cross slats slidably supported on the bottom crosswise of the box and each slat having an upstanding portion terminating in an upper edge, a shredding and distribution unit supported on the box across said open end in vertical alignment with the delivery end of said conveyor and comprising a drum rotatably supported on the box on an axis angularly disposed with respect to the direction of flow of material through said open end, a plurality of rods about the periphery of the drum, and a plurality of knives swingably supported about the periphery of the drum and pivoted directly on the rods, said drum rotatable downwardly on its side facing into the box, and said knives having outer end portions movable in a path contiguous to the plane of the upper edge of said slats for shearing cooperation therewith of material entered therebetween, said knives being paired and each pair having outwardly diverging outer end portions providing means for scooping the material and discharging and scattering it through said open end of the box.

2. In a manure spreader, the combination of a box having an open end and means for moving manure from the box out through said open end, a combination distributing and comminuting unit carried by the box at said open end and comprising a rotor supported from the box and including a plurality of hammers freely pivoted directly on the rotor and extending contrifugally outwardly pursuant to rotation of the rotor in attriting relation to material discharged through said open end, adjacent sets of said hammers having portions defining scoops for flinging the material from the box with a scattering effect.

References Cited in the file of this patent

UNITED STATES PATENTS

| | | |
|---|---|---|
| 230,871 | George | Aug. 10, 1880 |
| 682,309 | Zbornik | Sept. 10, 1901 |
| 1,646,878 | Schaefer | Oct. 25, 1927 |
| 1,769,715 | Schaefer | July 1, 1930 |
| 1,840,749 | Stresau | Jan. 12, 1932 |
| 2,509,343 | Henderson | May 30, 1950 |
| 2,590,065 | Mott | Mar. 18, 1952 |
| 2,688,832 | Gordon | Sept. 14, 1954 |
| 2,708,582 | Adams | May 17, 1955 |
| 2,740,247 | Worrell | Apr. 3, 1956 |
| 2,748,535 | Skromme et al. | June 5, 1956 |

FOREIGN PATENTS

| | | |
|---|---|---|
| 299,827 | Germany | Aug. 11, 1917 |